United States Patent
Garland et al.

[11] Patent Number: 6,167,042
[45] Date of Patent: Dec. 26, 2000

[54] COMMUNICATIONS BETWEEN SERVICE PROVIDERS AND CUSTOMER PREMISES EQUIPMENT

[75] Inventors: Stuart Mandel Garland, Morton Grove; David B. Smith, Hinsdale, both of Ill.

[73] Assignee: Lucent Technologies Inc., Murray Hill, N.J.

[21] Appl. No.: 08/931,567

[22] Filed: Sep. 16, 1997

[51] Int. Cl.[7] .................................................. H04L 12/66
[52] U.S. Cl. ..................... 370/354; 370/522; 379/106.09; 379/900
[58] Field of Search ..................................... 370/352, 354, 370/355, 522, 294; 379/5, 106.09, 142, 208, 900, 88.19, 92.04, 93.25; 702/62; 709/229; 340/426

[56] References Cited

U.S. PATENT DOCUMENTS

| | | |
|---|---|---|
| 4,716,562 | 12/1987 | Carse et al. ............................. 370/294 |
| 4,829,558 | 5/1989 | Welsh .................................... 379/92.04 |
| 4,833,618 | 5/1989 | Verma et al. ............................... 702/62 |
| 5,388,150 | 2/1995 | Schneyer et al. ..................... 379/88.19 |
| 5,737,400 | 4/1998 | Bagchi et al. ........................... 379/142 |
| 5,802,155 | 9/1998 | Garland et al. ..................... 379/106.09 |
| 5,825,849 | 10/1998 | Garland et al. .............................. 379/5 |
| 5,889,774 | 3/1999 | Mirashrafi et al. ..................... 370/352 |
| 5,917,405 | 6/1999 | Joao ...................................... 340/426 |
| 5,958,016 | 9/1999 | Chang et al. ........................... 709/229 |
| 5,999,526 | 12/1999 | Garland et al. ......................... 370/352 |

Primary Examiner—Hassan Kizou
Assistant Examiner—John Pezzlo
Attorney, Agent, or Firm—Werner Ulrich

[57] ABSTRACT

A service provider accesses the customer premises equipment of an end user via a broad based data network such as the Internet. Security precautions are described for insuring that alias users cannot access the customer premises equipment. Advantageously, a service provider may provide service over a very wide area without incurring excessive telecommunications services charges. Advantageously, many service providers can readily access the customer premises equipment of a single end user.

16 Claims, 7 Drawing Sheets

COMMUNICATIONS BETWEEN SERVICE PROVIDERS AND CUSTOMER PREMISES EQUIPMENT

TECHNICAL FIELD

This invention is related to methods and apparatus for communicating between information service providers and equipment associated with a service provider and located on the premises of the customer.

PROBLEM

The prior art has taught arrangements for communicating between a service provider, such as a utility and customer premises equipment, such as the meters for measuring service provided by the utility located at the customer's premises. The arrangement described in S. Garland, U.S. Pat. No. 5,189,694 allows utilities to access customer premises equipment using the public switched telephone network, without disturbing the customer through the use of a suppressed ringing connection. These arrangements are now widely used to read, for example, electric meters of customers of an electric power company.

As applications for remote access from a service provider, such as a utility, require longer holding times and as the service providers become more centralized, the cost of access to the local switches connected to the customers increases. This is particularly serious if the service provider is highly centralized serving customers served by a large number of local switching systems, the switching systems being located far from the centralized service provider, and especially if the holding time for connections between the utility and the customer premises equipment is long, e.g., downloading detailed charging information. A problem of the prior art, therefore is that there is not a good economical arrangement for providing access between a relatively centralized service provider, such as a meter reader in California or Europe, and a relatively scattered set of customers; scattered throughout the U.S.

SOLUTION

The above problem is significantly alleviated and an advance is made over the teachings of the prior art in accordance with this invention, wherein connections between a service provider and a customer are established using a broadly based data network such as the Internet network for communicating between a Gateway connected directly or through a telephone network to the service provider and another Gateway connected through the public switched telephone network to the customer. Advantageously, since the long haul portion of the connection is over a data network and since data is being transmitted between the service provider and the customer and not subject to a special tax, and since the occupancy of the data network for such a data connection is relatively low, the cost of this portion of the connection should be small; a data packet network is more suited for a telemetry application than a circuit switched network because of the short set-up time and the use of more robust error detection protocols.

In accordance with applicant's preferred embodiment, the connection between the Gateway and an end office serving the customer is over a Utility Telemetry Trunk (UTT) which has a class of service that the end office interprets as requiring the establishment of suppressed ringing connections to the customer. Either all calls from the Gateway over the UTT would require a suppressed ringing connection, or a protocol associated with the connection could instruct the Gateway that a suppressed ringing connection will be used for this connection.

Alternatively, Signaling System 7 (SS7) Common Channel Signaling (CCS) messages can be used to inform the switch that a suppressed ringing connection is required. Such SS7 messages can traverse a network including intermediate (tandem) switches.

The data network, such as the Internet network, establishes connections between two Gateways. By specifying a Gateway that is used only for these types of connections, the service provider can insure that a suppressed ringing connection is established toward the called customer since the Gateway will only use outgoing circuits that are connected to UTTs at the serving office.

In applicant's preferred embodiment, a Gateway may serve a plurality of service providers. The data in the message sent to the customer's equipment specifies which piece of equipment is being accessed. The connections from the service providers invoke the suppressed ringing feature. Inbound telemetry can also utilize a data network such as the Internet by establishing a connection to a Gateway for accessing the data network.

Security is a major problem in connections between service providers and customers using a no-ring connection method. Without security rival service providers may be able to read private customer data and mischievous "hackers" may be able to control customer equipment in undesirable ways. The normal security provision is the requirement that the service provider supply a private identification number specific to an individual customer and that the call will not be completed unless such a private identification number is supplied. The private identification number can be recognized at the Gateway, the switch serving the customer or the customer's premises equipment. In applicants' preferred embodiment, security arrangements are provided from the source Gateway (connected to the Internet) to ensure that no "hacker" can obtain control of the desired action from the second Gateway (connected to the public switched telephone network, (PSTN)); to protect the path from that Gateway to the customer; and(as is required by standards) at the customer premises equipment to guard against actions from a false source. The security arrangements also permit two different legitimate service providers, using different passwords, to access the customer premises equipment. The security code may also direct the Gateway to screen data provided by the CPE, and to send only a subset of that data to the sources of the inquiry.

Advantageously, the second Gateway can be one that is relatively close to the customer in order to minimize the use of the PSTN, even if the source Gateway serves a very large area, or the second Gateway can serve an entire region or country if there are limited Gateway resources in the region or country.

DETAILED DESCRIPTION

Figure 1:
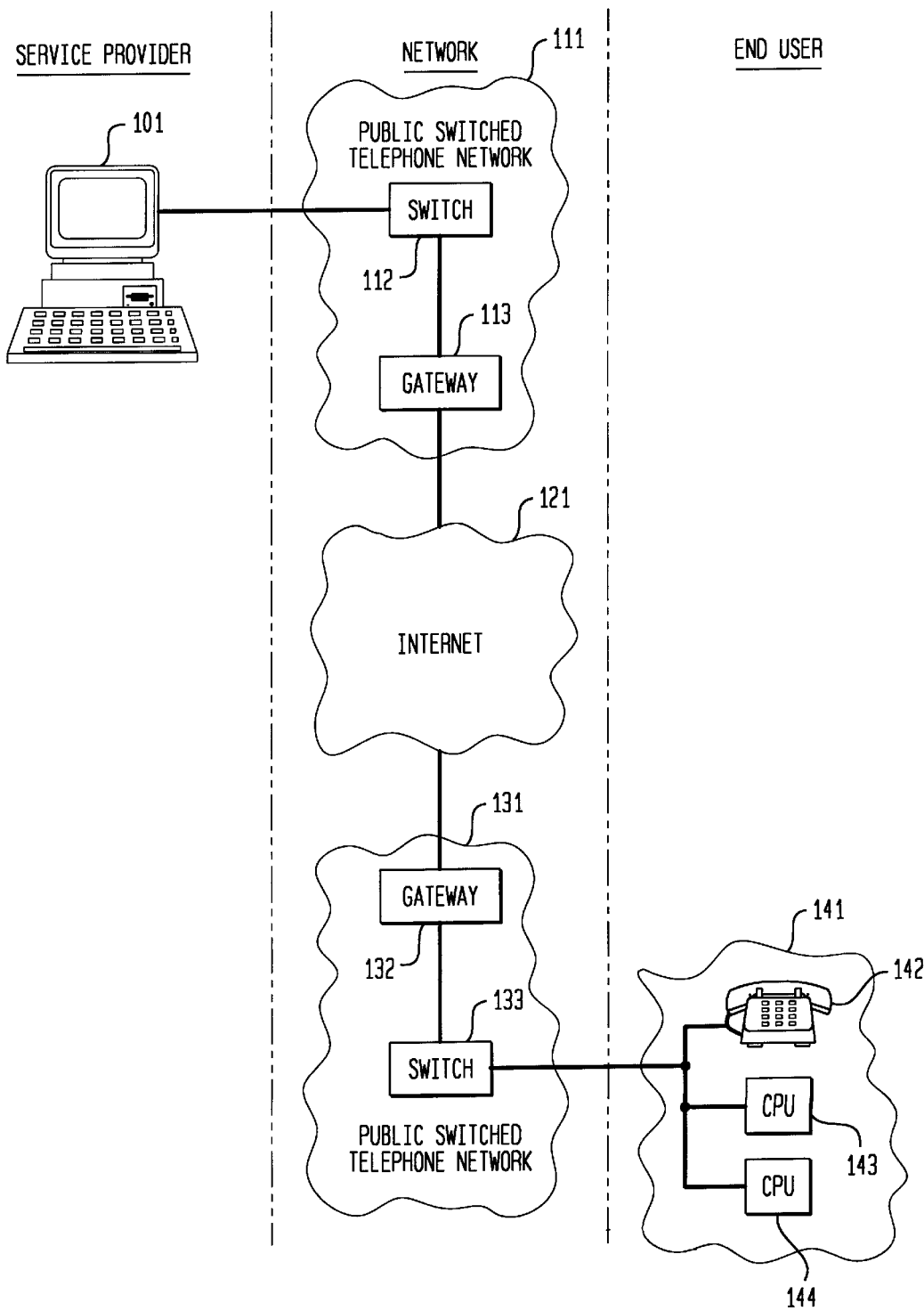
FIGS. 1 and 2 are blocked diagrams illustrating the basic connection architecture of applicants invention.

FIG. 1 is an overall diagram illustrating connection established in accordance with the principles of applicant's invention. A terminal 101 at the service provider's premises is connected to segment 111 of the public switched telephone network. The service provider is connected to a serving switch 112 and thence either directly or through other switches to a service provider Gateway 113.

Gateway 113 is connected to a broadly based data network which in applicant's preferred embodiment is the Internet network 121. Messages destined for customer premises equipment 141 are addressed to the Internet network in such a way that these messages are transmitted to a customer premises Gateway 132. The customer premises Gateway 132 is connected directly or through intermediate switches to switch 133 which services the called customer's premises equipment 141. The connection to switch 133 is via a UTT. The UTT has associated translation information in switch 133 which causes switch 133 to establish connections from the UTT to customer premises equipment using a suppressed ringing connection.

If the customer premises equipment (CPE) initiates an outgoing call to the service provider, this is done as a standard off-hook origination; i.e., an "inbound" telemetry call. In that case, the CPE would initiate a call to the Gateway, perform security checks, and access the Internet over the service provider, Gateway. To make the inbound call, the CPE would use an access code. This would allow the switch to make the call only to the first Gateway, even though there were restrictions placed on the line by the end user.

Calls from the service provider to the CPE using suppressed ringing can use on-hook or off-hook data transmission. With on-hook transmission, when the customer goes off-hook to originate a conventional voice call (e.g., voice) the switch can detect the off-hook signal, and cause the suppressed ringing connection to be disconnected, and cause dial tone to be delivered to the end user. With off-hook transmission, the switch does not detect such a request for origination. The CPE must either go on-hook, or must send a data signal to the Gateway. In either off-hook transmission case, the Gateway causes a disconnect to be sent to the switch and the CPE causing the CPE to go on-hook if it is not already on-hook. With all CPE on-hook, the switch then senses the end user off-hook and delivers dial tone.

The customer premises equipment 141 includes a telephone 142 and as shown to customer premises units 143 and 144 for communicating with service providers.

Figure 2:
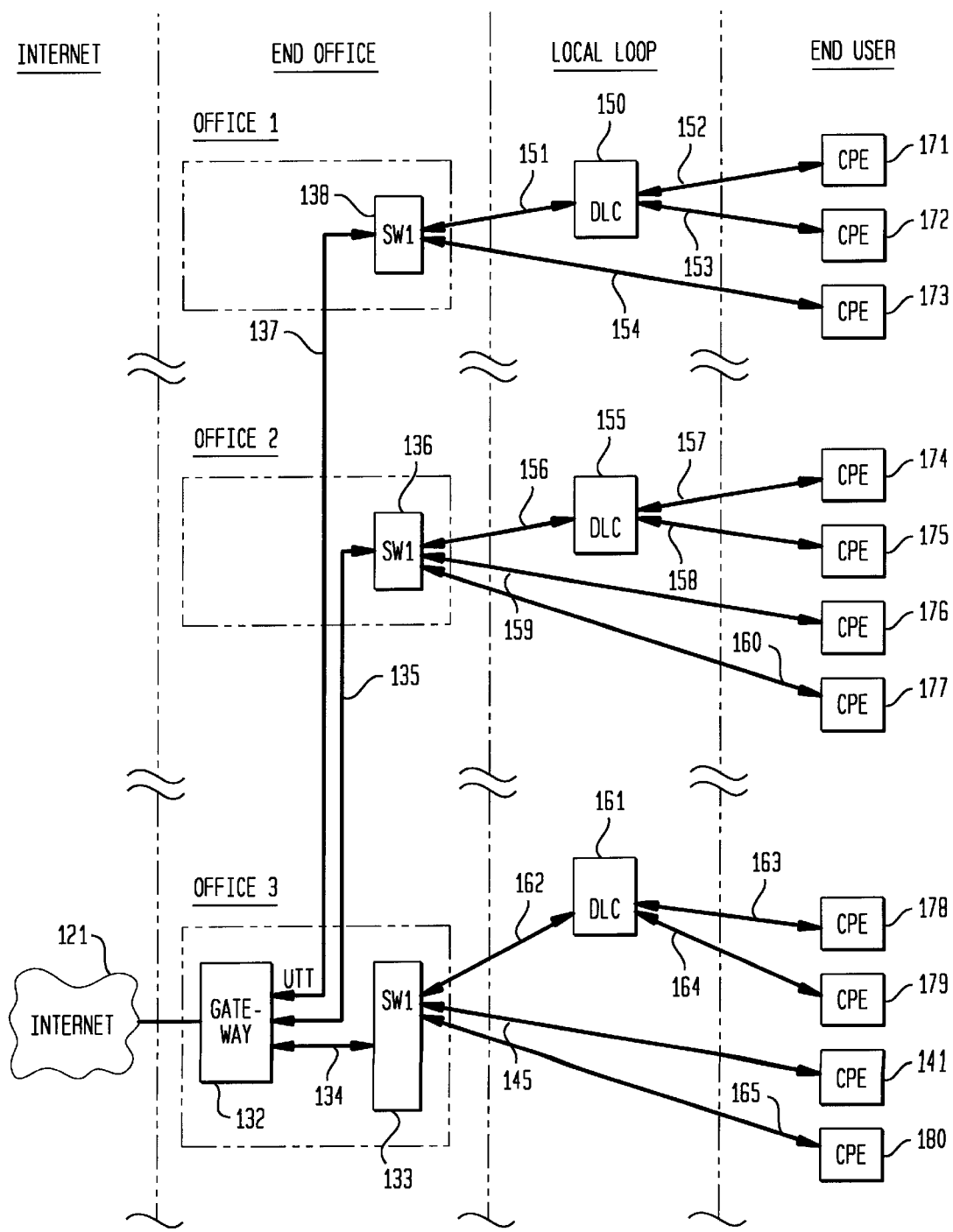

FIG. 2 is an expanded version of the part of FIG. 1 which shows the connection between the Internet network 121 and customer premises equipment 141. Gateway 132 is connected via UTT 134 with switch 133; via UTT 135 with switch 136; and via UTT 137 with switch 138.

Switch 138 is connected by local loop segment 151 to a digital loop carrier 150 which in turn is connected via local loop segments 152 and 153 to customer premises equipment 171 and 172 respectively. Switch 138 is also connected directly through a local loop 154 to customer premises equipment 173.

Switch 136 is connected via local loop segment 156 to digital loop carrier 155 which in turn is connected via loop segments 157 and 158 to customer premise equipment 174 and 175 respectively. Local loops 159 and 160 connect switch 136 to customer premises equipment 176 and 177 respectively.

Switch 133 is connected via local loop segment 162 with digital loop carrier 161 which in turn is connected by local loop segments 163 and 164 with customer premises equipments 178 and 179 respectively. Switch 133 is also through local loop 145 with customer premises equipment 141 and through local loop 165 with customer premises equipment 180.

Figure 3:
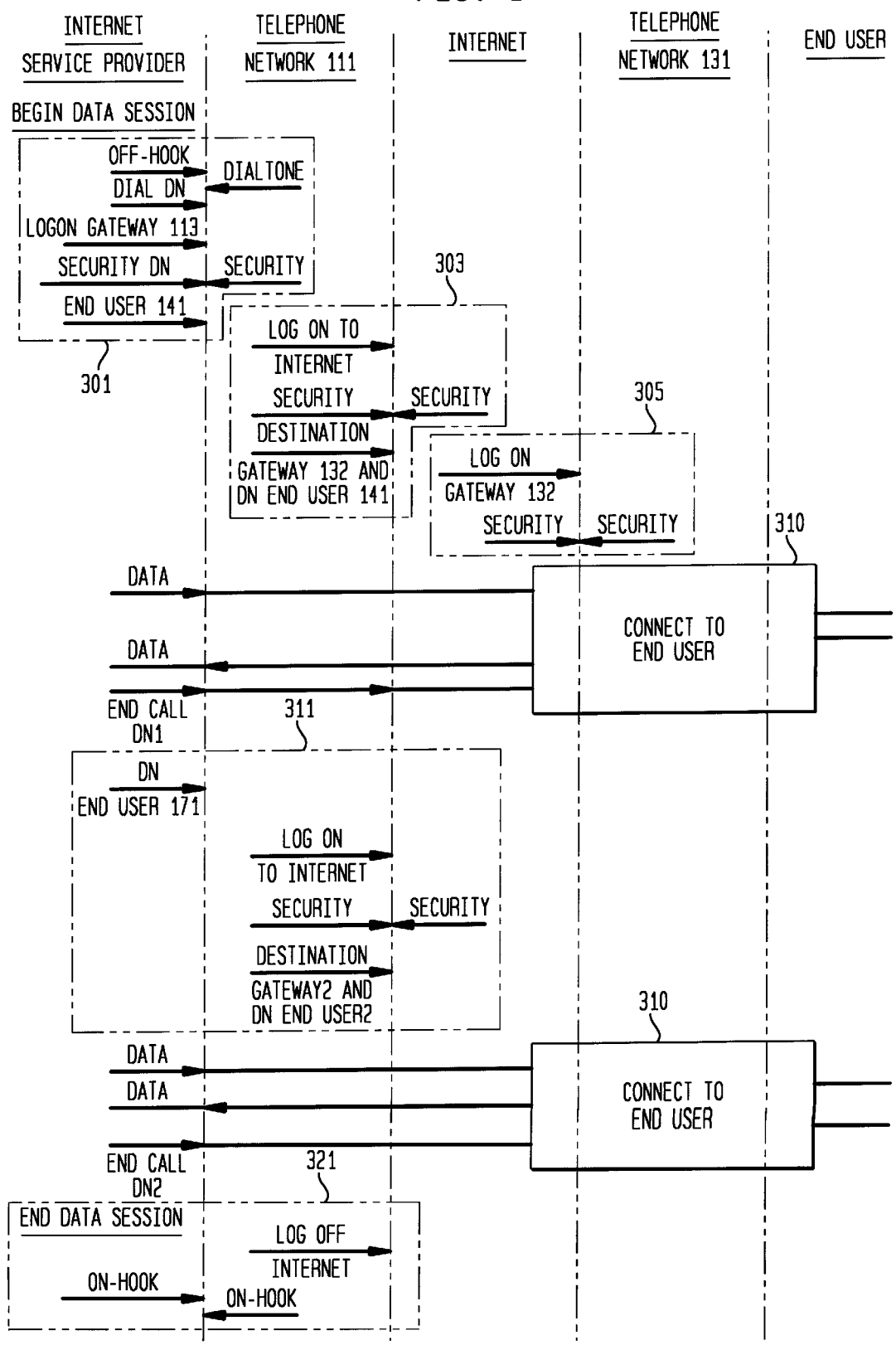
FIGS. 3–7 are diagrams illustrating the succession of messages and actions as well as their sources and destinations for implementing applicant's invention.

FIG. 3 illustrates the arrangements for connecting a service provider to the Internet. Two basic connection arrangements are shown, one consisting of blocks 301, 303 and 305 for an original connection of a data session, in this case to end user 141 and the second consisting of block 311 for a second connection to another end user, 171. Block 321 is for a disconnect at the end of the data session. At the beginning of the data session for the first end user (Action block 301) the service provider goes off hook, receives dial tone from telephone network 111, dials the directory number of the called Gateway and logs on to Gateway 113. A security dialogue then takes place between the service provider and Gateway 113 in which the service provider provides, for example, a private identification number for the called end user.

Action block 303 illustrates the actions to permit the telephone network access the Internet. First, the Gateway 113 logs on to the Internet. A security dialogue between the Internet and the Gateway 132 is used to establish the right of the party connected to this connection, i.e., the service provider to access the Internet for connection to one of the class of Gateways for accessing end users. If the security dialogue is satisfactory then the Gateway 113 provides the identification of Gateway 132 and the directory number of end user 141. There may be a directory look-up, in that only the end user (CPE) directory number is required. The directory look-up provides the routing to the proper "local" Gateway.

Action block 305 illustrates the operations to allow the Internet to access the Gateway 132. The Internet logs on to Gateway 132 and a security dialogue is carried out between Internet and Gateway 132.

If the same terminating Gateway (in this case, Gateway 132) is used for accessing a plurality of end users within one data session, it is not necessary to repeat Action blocks 301 and 305 before each connection to a user. Action block 310, a data session with one end user, is spelled out in detail in FIGS. 4 and 5. Data is first sent from the Internet service provider and received by the end user. Response data is sent from the end user back to the service provider. This dialogue goes back and forth until the service provider sends an end call signal to initiate a disconnection.

Action block 311 illustrates an alternate arrangement for accessing a different end user such as end user 171. The service provider dials the directory number of the end user 171. The actions of block 301 and 305 need not be repeated. The Gateway 113 logs on to the Internet and there is a security dialogue between the Internet and the Gateway. The Gateway 113 supplies the identification of Gateway 132 and the directory number of user 171. It is also not necessary to log on to Gateway 132 since this action took place at the beginning of the session. Action block 310 is then executed. At the end of a data session the actions of block 321 are performed, Gateway 113 logs off the Internet, the service provider goes on-hook and the switch 112 returns an on-hook signal.

Figure 4:
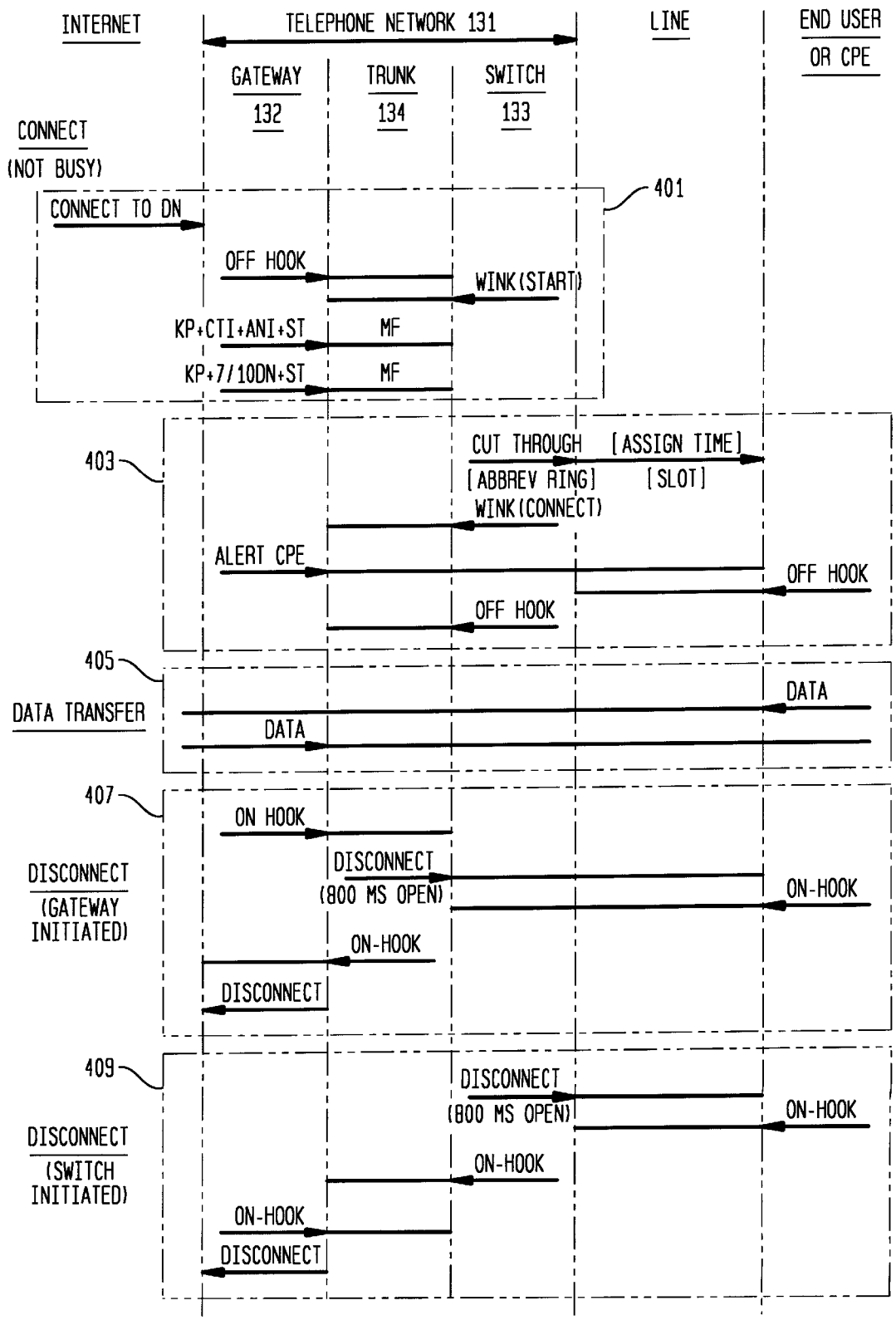

FIG. 4 illustrates the actions performed in the part of the connection between the Internet and the called end user. The telephone network referred to is telephone network 131 which uses connection elements Gateway 132, trunk 134, and switch 133. The line is local loop 145 and the end user is customer premises equipment 141.

In Action block 401, the Gateway receives a message to connect to the directory number of end user 141. The Gateway passes an off-hook signal to trunk 134 and switch 133 returns a wink signal to start transmitting signals over trunk 134. The signals transmitted from the Gateway over an analog trunk are multi-frequency (MF) signals. Signals representing a key pulse (KP), a CTI (CPE Transmission Indicator) signal representing the end user's transmission mode (on-hook or off-hook), the automatic number identification (ANI) of the caller, in this case the billing number of the service provider, and a start signal representing the end of the train of MF signals. Thereafter, another set of signals is sent consisting of the KP signal, 7 or 10 digits of the called customer and the start signal. The start signal may be one of four start signals used for identifying an abbreviated ringing interval, as described in the cited patent, U.S. Pat. No. 5,189,694. The ANI signal is sent to provide the switch with the number of the caller so that the switch can perform a security check to make sure that the caller is authorized to access the called line and to allow the switch to bill the service provider. The switch then sets up a cut through connection to the customer premises equipment which establishes a suppressed ringing connection. If (Action block 403) a digital loop carrier is used for the connection, a time slot must be assigned. Abbreviated ringing is used to cause a time slot to be assigned in the digital loop carrier without actually applying ringing to the end user; the length of the abbreviated ringing burst is specified by the type of start signal of the final signaling string. The switch then sends a wink signal to the Gateway to indicate that the end user has been connected over trunk 134 and Gateway 132 responds by sending a message to alert the CPE equipment of the end user. For off-hook transmission, the CPE user sends an off-hook signal back to the switch which passes the off-hook signal back to the Gateway; for on-hook transmission, the CPE remains on-hook and data is transmitted directly.

For the case wherein a single (CPE) having a single directory number supports several devices, the choice of the device being accessed can be specified by data in the message to the CPE. TCP/IP signals can be used to specify the choice of device to the CPE.

Action block 405 simply indicates that the CPE user can send data back to the Gateway and the Gateway sends data to the CPE user; i.e., that the data transmission is bi-directional.

Action block 407 describes actions performed if the disconnect is initiated by Gateway 132. Gateway 132 sends an on-hook signal to trunk 134 which causes the switch to send a disconnect signal (800 milliseconds) of open loop to the CPE. The CPE responds with an on-hook signal which is passed by the switch to the trunk and is returned to the Gateway 132 which sends a disconnect message to Internet network 121.

Action block 409 illustrates the actions performed if the disconnect is switch initiated. This could happen if the disconnect is initiated by the craft controlling the switch, or in response to overload or other special conditions, or for emergency conditions. The switch sends an 800 millisecond open signal over the loop to the CPE which responds with an on-hook signal to the switch. The switch passes the on-hook signal to trunk 134 and the Gateway 132 responds with an on-hook signal to the switch. The switch passes the on-hook signal to trunk 134 and the Gateway 132 responds with an on-hook signal to the trunk. The Gateway then sends a disconnect signal to the Internet network.

Figure 5:
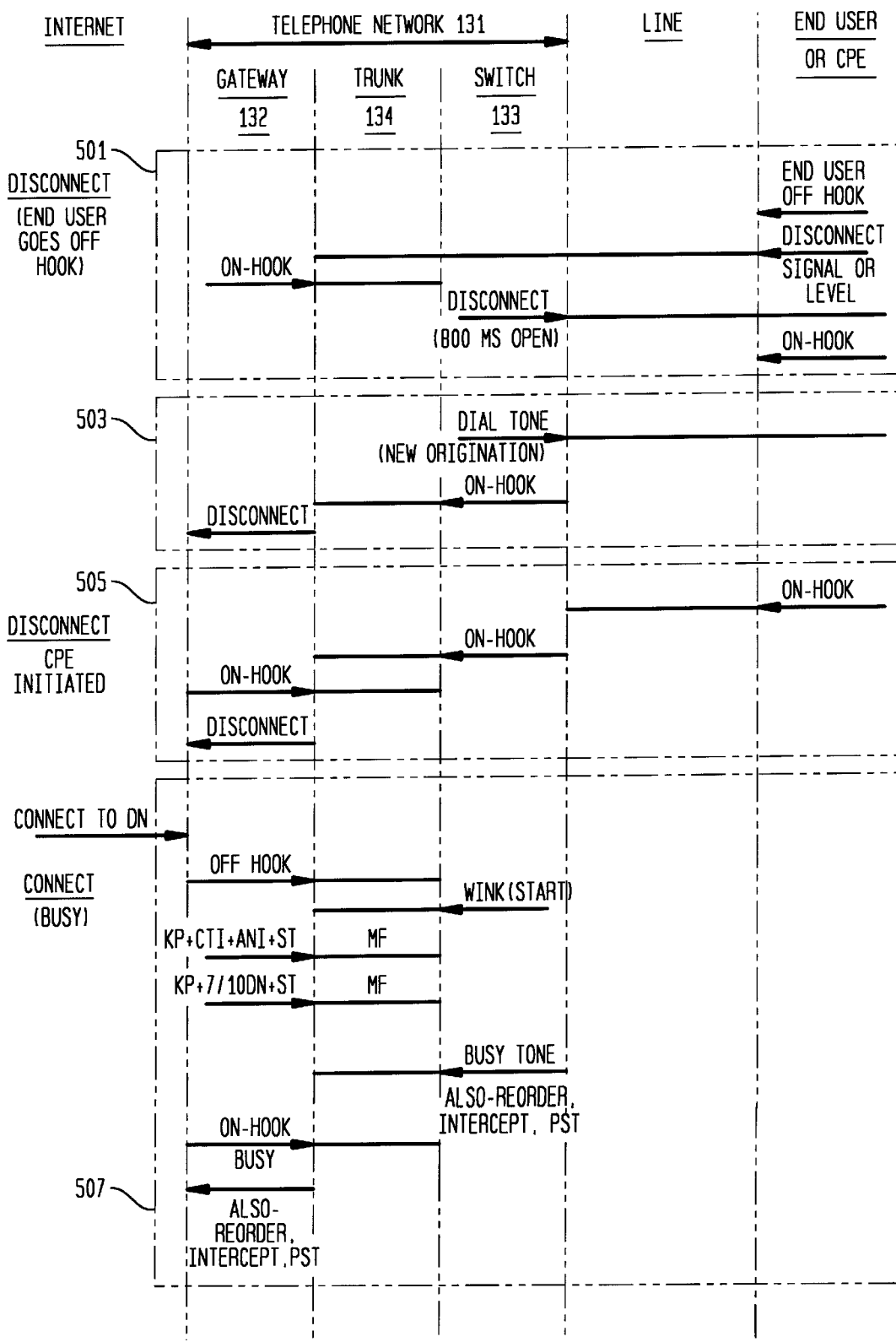

FIG. 5 illustrates the case in which there is a disconnect because the CPE goes off hook, a disconnect initiated by the customer premises equipment and the sequence for connection when it is found that the CPE line is busy. Action Blocks 501 and 503 illustrate the case in which there is a disconnect initiated by the CPE going off-hook. In Action block 501, the CPE goes off-hook which sends a disconnect signal or a level change to the switch which in turn passes that disconnect signal via the trunk to the Gateway. Alternatively, the CPE detects a level change, caused by the end user going off-hook, and goes on-hook. The Gateway goes on-hook since it is no longer receiving data from the CPE or has received a disconnect request in the data stream. The Gateway sends an on-hook signal to the trunk and the switch sends a disconnect signal (800 milliseconds open) to CPE to clear the line. The switch then determines that a new origination has occurred, (end user still off-hook), and returns dial tone to the end user to initiate a new call. The switch also sends an on-hook signal over the trunk to the Gateway and the Gateway sends a disconnect signal to the Internet network.

Action block 505 illustrates the case in which there is a disconnect initiated by the customer premises equipment. The customer premises equipment sends an on-hook signal over the line to the switch 133. Switch 133 sends an on-hook signal over the trunk to the Gateway and the Gateway returns the on-hook signal over the trunk to the switch and sends a disconnect message to the Internet.

It is important to note that a disconnect action is not complete in a switch until an on-hook has been sent in both directions.

Action block 507 illustrates actions performed in the telephone network 133 when a message is received from the Internet network to connect to a directory number and the line of that directory number is busy. A message is received to connect to that directory number and an off hook signal is sent from the Gateway via the trunk to the switch. As described earlier, the switch returns a wink signal to request that the called number be signaled. The Gateway signals first the ANI (billing number of the caller) and then the directory number of the called line. The switch makes a busy check, finds the line busy, and returns busy tone (or reorder or intercept or permanent signal tone) to the Gateway. The Gateway in response to receiving this busy tone returns an on-hook signal to the switch and transmits a busy message (or reorder or intercept or permanent signal tone) to the Internet to be forwarded to the caller (in this case, the service provider).

Figure 6:
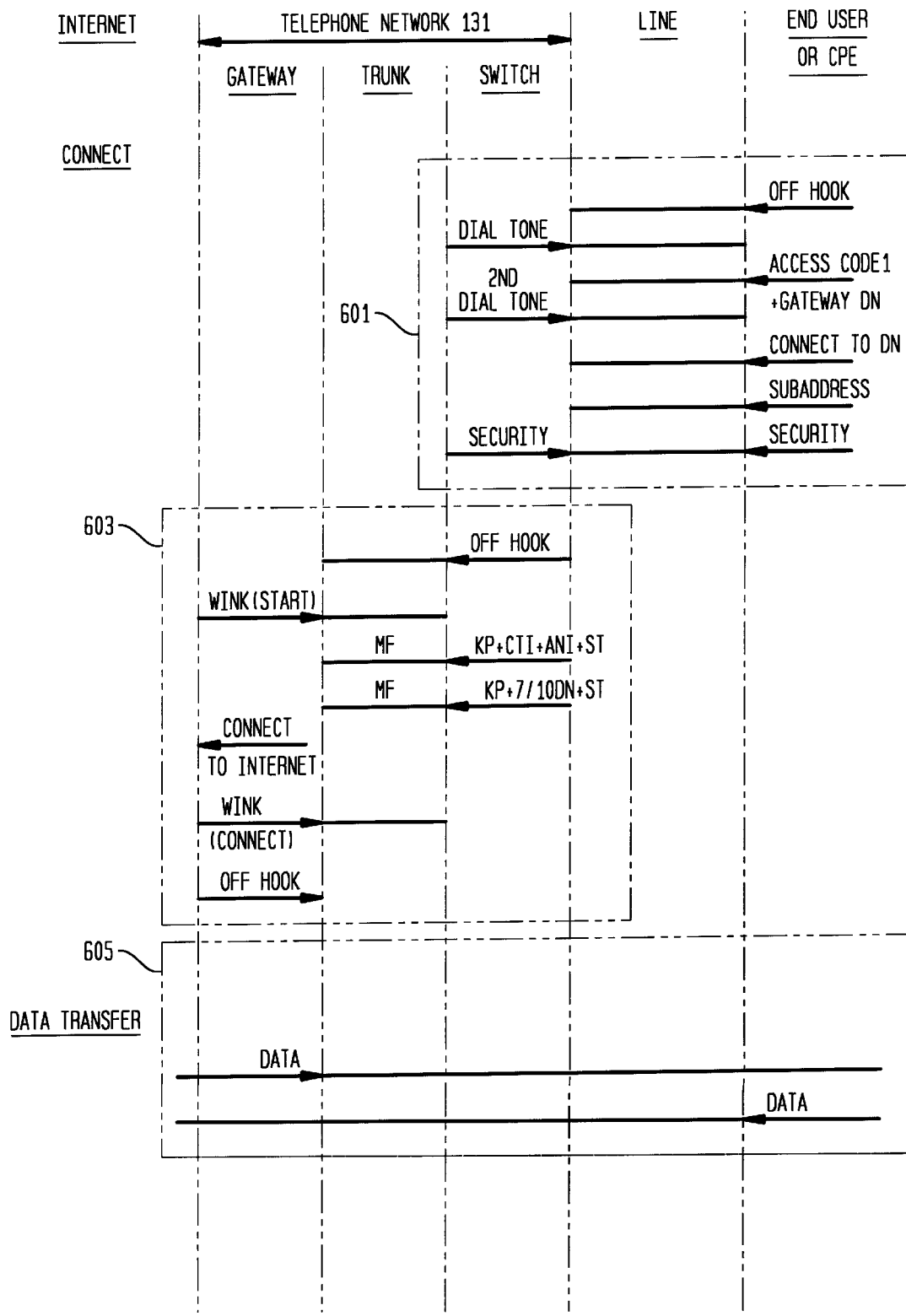

FIG. 6 illustrates actions performed in accessing the Internet network from the end user or customer premises equipment. In Action block 601 the end user or customer premises equipment goes off hook and this off hook signal is transmitted to the switch, the switch returns dial tone and the CPE dials an access code plus the directory number of the Gateway to the Internet. The access code is an indicator to the switch that this is a telemetry call and requires a second dial tone or dual directory number string. The switch responds by returning a second dial tone and the customer premises equipment dials the directory number of the service provider plus any sub-address. The subaddress is used to identify a destination within the CPE, for example, a local area network and the position of a device on that network in a house. The additional data for a subaddress is signaled by the CTI position which is changed to a telemetry function indicator as described in S. Garland: U.S. Pat. No. 5,509,054. A security dialogue then takes place between the end user and the switch to insure that the originating end user is authorized to access the service provider. In Action block 603 the switch then transmits an off hook signal over the trunk to the Gateway and the Gateway returns a wink signal over the trunk to inform the switch that it is ready to receive signaling information. As previously described, the billing number (ANI) of the caller and the called number (i.e., the number of the service provider) are then sent over the trunk to the Gateway and the Gateway sends a connect message containing the appropriate numbers to the Internet network for completion of the call. The Gateway returns a wink signal to the trunk to indicate that the signaling connection has been established and returns an off-hook to the trunk to complete the connection.

Action block 605 merely indicates that data is received at the Gateway and is transmitted to the end user or customer premises equipment and that the customer premises equipment sends data over the connection to the service provider.

Figure 7:
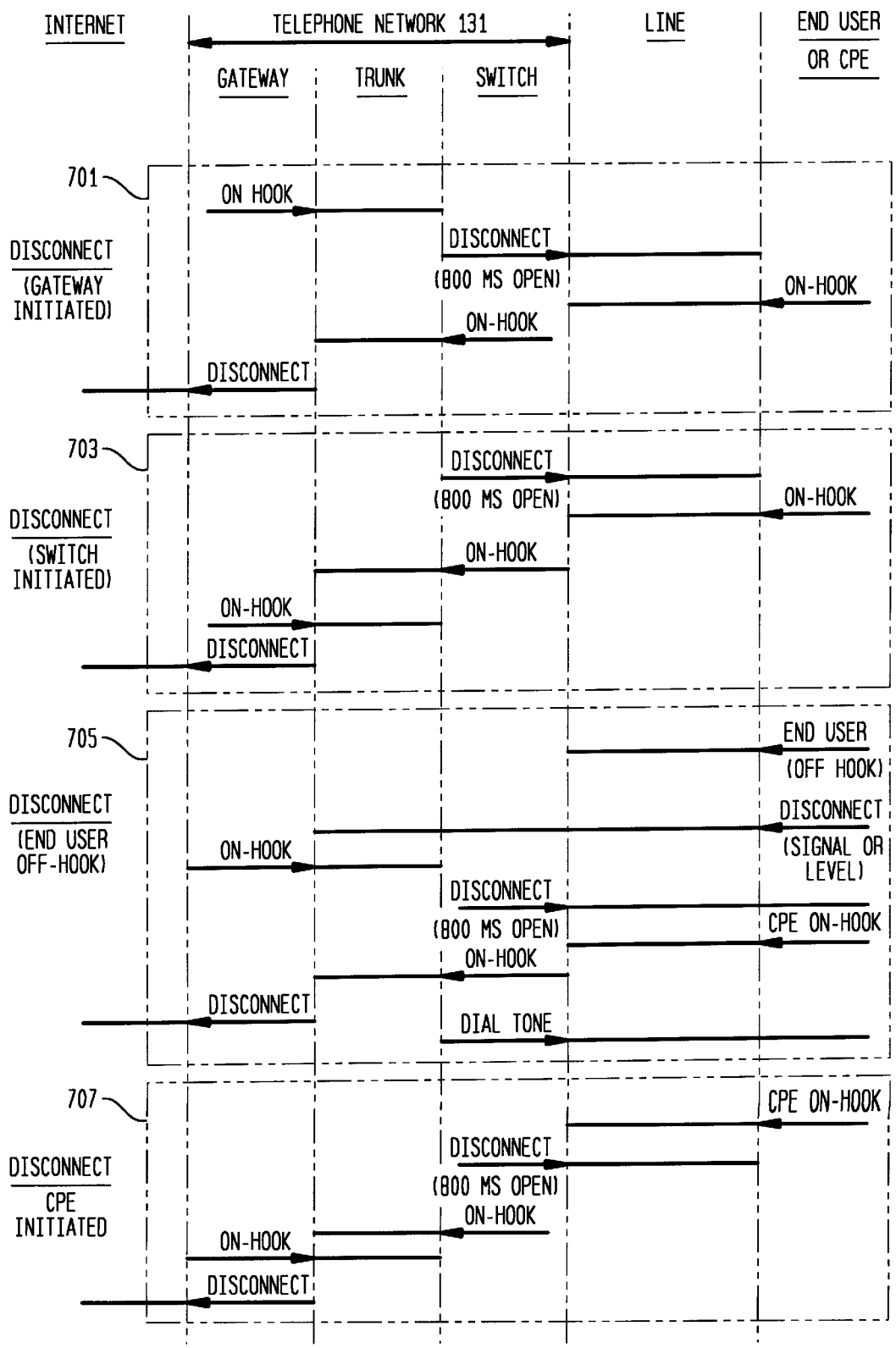

FIG. 7 illustrates the various disconnect sequences between the end user or customer premises equipment and the Internet network. Action block 701 illustrates the sequence of events for a disconnect initiated by the Gateway in response to a disconnect request from the service provider. The Gateway sends an on-hook signal over the trunk to the switch, switch sends a disconnect signal (800 milliseconds open) over the line to the customer premises equipment and customer premises equipment responds with an on-hook signal. The on-hook signal is sent by the switch over the trunk to the Gateway and the Gateway sends a disconnect message to the Internet network.

Action Block 703 illustrates the case in which the disconnect is initiated by the switch. The switch sends a disconnect signal (800 milliseconds open loop) over the line to the customer premises equipment. The customer premises equipment returns an on-hook signal and the switch forwards the on-hook signal over the trunk to the Gateway. The Gateway then returns an on-hook signal over the trunk to the switch and sends a disconnect message to the Internet network.

Action Block 705 illustrates disconnect actions caused by the end user going off-hook. Action Block 705 is similar to actions blocks 501 and 503, except that the end user has priority over the service provider; i.e., when the end user wishes to make a call, the user causes the CPE/Gateway to initiate a disconnect of the connection to the service provider. Action block 707 is similar to action block 505, with the same reservation.

The above description has been in terms of analog customer premises equipment. Digital customer premises equipment such as integrated services digital network (ISDN), telephones would receive their signalling messages over a separate channel, that D-channel which messages obviate the need for special tones and special use of CPE dual tone multi-frequency (DTMF) signal strings. The techniques for converting from analog signalling to signalling for digital telephones are well known in the prior art.

Similarly, for signalling within the public switched telephone network if common channel signalling is used, then the common channel signalling messages can carry information indicating the requirement for a suppressed ringing connection without requiring that a trunk dedicated by its class of service to handle suppressed ringing connections be used and further that the request for the suppressed ringing connection can be carried through several switches in a connection within the public switched telephone network. The above example is one preferred embodiment of applicant's invention. Many other arrangements will be apparent to those of ordinary skill in the art without departing from the scope of the invention. The invention is thus limited only by the attached claims.

What is claimed is:

1. A method of establishing a connection between a service provider terminal and end users customer premises equipment comprising the steps of:

establishing a connection from said service provider terminal to a broadly based data network, said broadly based data network connectable to a large plurality of end office switches;

in said broadly based data network, extending said connection to a public switched telephone network;

establishing a connection from said data network via said public switched telephone network to a switch serving said end user; and establishing a suppressed ringing connection, wherein ringing is suppressed at said switch, between said switch and said end user's customer premises equipment.

2. The method of claim 1 wherein the step of establishing a connection to said broad based network comprises the step of establishing a connection to said broad based data network via a public switched telephone network.

3. The method of claim 2 wherein the step of establishing a connection to said broad based data network comprises the step of establishing a connection to a switch serving said terminal and establishing a connection between said switch and a Gateway to said broad based data network;

said Gateway for serving service providers.

4. The method of claim 3 wherein the step of establishing a connection between said broad based network and said switch comprises the step of establishing a connection between said broad based data network and a Gateway for serving service provider calls and establishing a connection between said Gateway and said switch.

5. The method of claim 1 wherein said service provider provides security data for identifying itself.

6. The method of claim 1 wherein said customer premises equipment responds with security data for identifying itself.

7. The method of claim 1 wherein said switch provides data to said customer premises equipment for verifying the authority of said service provider to access said customer premises equipment.

8. The method of claim 1 wherein said broadly based network is an Internet.

9. Apparatus for establishing a connection between a service provider terminal and end user's customer premises equipment, comprising:

a broadly based data network connectable to a large plurality of end-office switches for forming at least a part of a connection between said service provider terminal and a Public Switched Telephone Network;

said Public Switched Telephone Network comprising means for connecting said broadly based data network and a switch serving said end user; and means for establishing a suppressed ringing connection, wherein ringing is suppressed by said switch, between said switch and said end user's customer premises equipment.

10. The apparatus of claim 9, further comprising a second Public Switched Telephone Network for connecting said service provider terminal to said broad based data network.

11. The apparatus of claim 10, wherein said apparatus for establishing a connection to said broad based data network comprises apparatus for connecting said service provider terminal to a switch serving said service provider terminal, and establishing a connection over said Public Switched Telephone Network to a gateway of said Public Switched Telephone Network for accessing said broad based data network, said gateway for serving service providers.

12. The apparatus of claim 11, wherein the apparatus for establishing a connection between said broad based data network and said switch for serving said end user's customer premises equipment comprises a gateway for serving service provider calls, and a Public Switched Telephone Network for establishing a connection between said gateway and said switch for serving said end user.

13. The apparatus of claim 9, wherein said service provider terminal provides security data for identifying itself.

14. The apparatus of claim 9, wherein said customer premises equipment comprises means for responding with security data for identifying itself.

15. The apparatus of claim 9, wherein said switch for serving said customer premises equipment provides data for verifying the authority of said service provider to access said customer premises equipment.

16. The apparatus of claim 9, wherein said broadly based network is an Internet.

* * * * *

UNITED STATES PATENT AND TRADEMARK OFFICE
CERTIFICATE OF CORRECTION

PATENT NO. : 6,167,042  
DATED : December 26, 2000  
INVENTOR(S) : Ginn et al.

Page 1 of 1

It is certified that error appears in the above-identified patent and that said Letters Patent is hereby corrected as shown below:

Column 1,
Line 30, change "nurser's" to -- nurse's --.

Column 8,
Line 59, please change "on e" to -- one --.

Signed and Sealed this

Twenty-third Day of April, 2002

Attest:

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO. : 6,167,042
DATED : December 26, 2000
INVENTOR(S) : Stuart Mandel Garland It is certified that error appears in the above-identified patent and that said Letters Patent is hereby corrected as shown below:

This Certificate supersedes Certificate of Correction issued April 23, 2002, the number was erroneously mentioned and should be deleted since no Certificate of Correction was granted.

Signed and Sealed this

Seventeenth Day of September, 2002

Attest:

JAMES E. ROGAN
Attesting Officer   Director of the United States Patent and Trademark Office